United States Patent [19]

Allan

[11] Patent Number: 4,526,190

[45] Date of Patent: Jul. 2, 1985

[54] CONTROL VALVE ASSEMBLY

[76] Inventor: David T. Allan, 9 Broomhill Dr., Rutherglen, Glasgow, Scotland, G73 3QH

[21] Appl. No.: 521,605

[22] Filed: Aug. 9, 1983

Related U.S. Application Data

[63] Continuation-in-part of Ser. No. 241,856, Mar. 9, 1981, abandoned.

[51] Int. Cl.$^3$ .......................... F01L 25/02; G05D 11/00

[52] U.S. Cl. .......................................... 137/119; 91/317; 91/325

[58] Field of Search .......................... 91/317, 299, 325; 137/119, 112

[56] References Cited

U.S. PATENT DOCUMENTS

| | | | |
|---|---|---|---|
| 1,078,188 | 11/1913 | Clement | 91/299 |
| 2,090,031 | 8/1937 | Curdis | 91/317 |
| 2,334,403 | 11/1943 | Forss | 91/317 |
| 3,504,692 | 4/1970 | Goldstein | 137/119 |
| 3,614,965 | 10/1971 | Metivier | 137/119 |

FOREIGN PATENT DOCUMENTS

| | | | |
|---|---|---|---|
| 379665 | 8/1923 | Fed. Rep. of Germany | 91/317 |
| 615229 | 10/1926 | France | 91/317 |
| 792201 | 3/1958 | United Kingdom | 137/112 |

*Primary Examiner*—Paul E. Maslousky

*Attorney, Agent, or Firm*—Kirschstein, Kirschstein, Ottinger & Israel

[57] ABSTRACT

A control valve assembly for a pneumatic paving breaker which enables the maximum amount of energy to be imparted to the piston on its working stoke while restricting the energy imparted to the piston on its return stroke and which utilizes a reduced consumption of air, has an optimum speed of response and is relatively cheap to manufacture. This is achieved by having a valve member in the form of a pure cylindrical slug which reciprocates in a valve block in which it is a clearance fit.

4 Claims, 3 Drawing Figures

CONTROL VALVE ASSEMBLY

CROSS-REFERENCE TO RELATED APPLICATION

This application is a continuation-in-part of co-pending application Ser. No. 241,856, filed Mar. 9, 1981, now abandoned.

BACKGROUND OF THE INVENTION

This invention relates to a control valve assembly for use in pneumatic paving breakers and other similar pneumatic reciprocating motors.

Paving breakers are well known and generally comprise a free piston which is reciprocable within a cylinder powered by compressed air and which at the bottom of its stroke strikes a tappet or anvil located directly above a tool, the latter resting on the surface being worked. The reciprocating motion of the piston is achieved by feeding compressed air alternately to each end of the piston under the control of a control valve assembly. A port is also provided in the cylinder to enable exhaust of air from each end of the piston, alternately, as it reciprocates in the cylinder. Moreover, as the energy to be imparted to the piston on its return stroke is substantially less than that for the working stroke it is essential to meter the flow of air to the underside of the piston so that there is a minimum consumption of air supplied for the return stroke. Furthermore, the speed of response of the valve is critical if efficient use is to be made of the compressed air available.

SUMMARY OF THE INVENTION

Thus, an object of the present invention is to provide a control valve assembly for a paving breaker or the like which improves the efficiency of the paving breaker by providing optimum metering of the compressed air supplied for the return stroke of the piston, which has an optimum speed of response and which is relatively cheap to manufacture.

To this end there is provided a control valve assembly for a pneumatic reciprocating motor comprising: a valve block; an annular boss depending from said valve block, an inner cylindrical surface of said boss defining a cylindrical bore, said bore having a lower end face and an upper end face; a first outlet in said valve block communicating with said lower end face of said cylindrical bore, a second outlet in said valve block communicating with said upper end face of said cylindrical bore; an inlet in said annular boss communicating with said cylindrical surface of the boss for providing a supply of pneumatic fluid to said bore; a cylindrical valve member reciprocal within said cylindrical bore, the valve member having an upper end face, a lower end face and a cylindrical surface of uniform diameter throughout the length of the valve member; and a clearance between the cylindrical surface of the valve member and the inner cylindrical surface of said bore; said valve member being movable between a first position in which said upper face of the valve member closes said second outlet and permits flow of pneumatic fluid from the inlet directly to said first outlet and a second position in which the said lower face of the slug closes said first outlet and allows flow of pneumatic fluid from said inlet to said second outlet only through said clearance between the cylindrical surface of the valve member and the inner cylindrical surface of said bore.

BRIEF DESCRIPTION OF THE DRAWINGS

Embodiments of the present invention will now be described, by way of example, with reference to the accompanying drawings in which.

DESCRIPTION OF PREFERRED EMBODIMENTS

Figure 1:
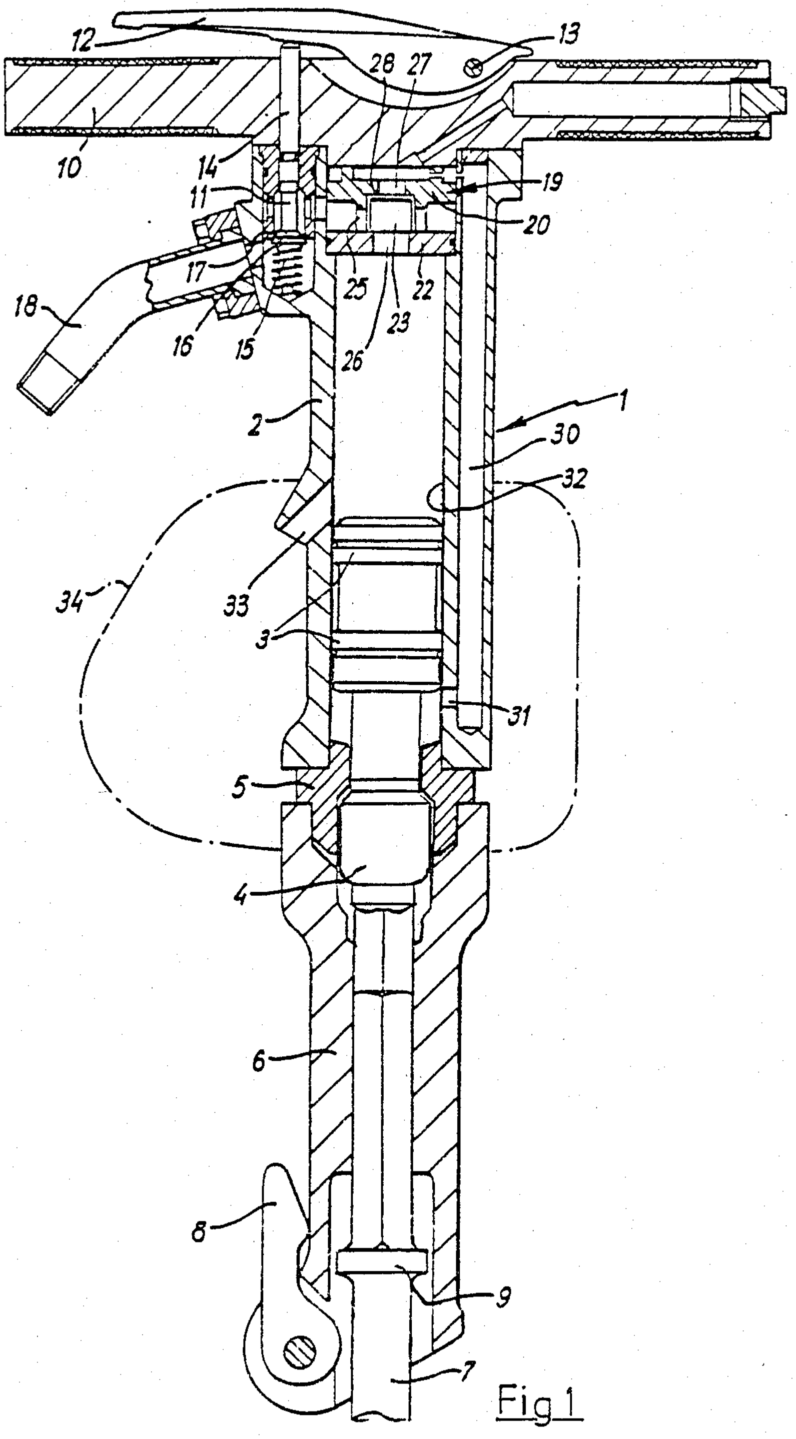
FIG. 1 shows a sectional side view of a paving breaker including a control valve assembly according to the invention.

Referring now to the drawings, a pneumatically operated paving breaker 1 comprises a cylinder 2 in which a piston 3 is reciprocable so that at the bottom of its stroke as shown in FIG. 1 the piston 3 strikes a tappet 4 located in a tappet bushing 5 which connects the cylinder 2 to a chuck housing 6. A tool bit 7 is reciprocable in the chuck housing 6 and is retained therein by a retainer 8 cooperating with a flange 9 on the tool 7.

A handle arrangement 10 is secured to the top end of the cylinder 2 through securing bolts (not shown) and a throttle valve 11 is provided below the handle arrangement 10 and is operable by a lever 12 pivotally mounted at 13 on the handle. The throttle valve 11 comprises a spool 14 biassed by a spring 15 to the position shown in FIG. 1 in which a shoulder 16 on the spool 14 seals against a valve seat 17 so as to prevent flow of air from an air inlet connection 18 to a control valve assembly 19 located above an upper end of the cylinder 2. The above arrangement represents a conventional pneumatically operated paving breaker.

Figure 2:
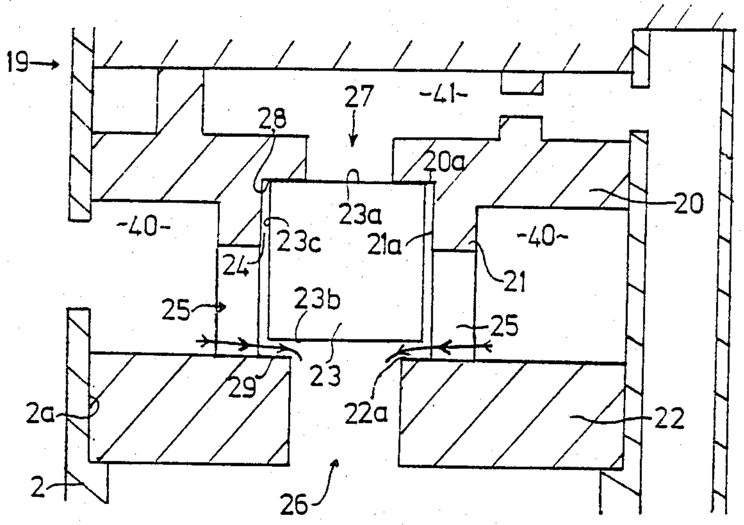
FIG. 2 is an enlarged sectional view in elevation of the control valve assembly of the paving breaker of FIG. 1 in a first operating position.
Figure 3:
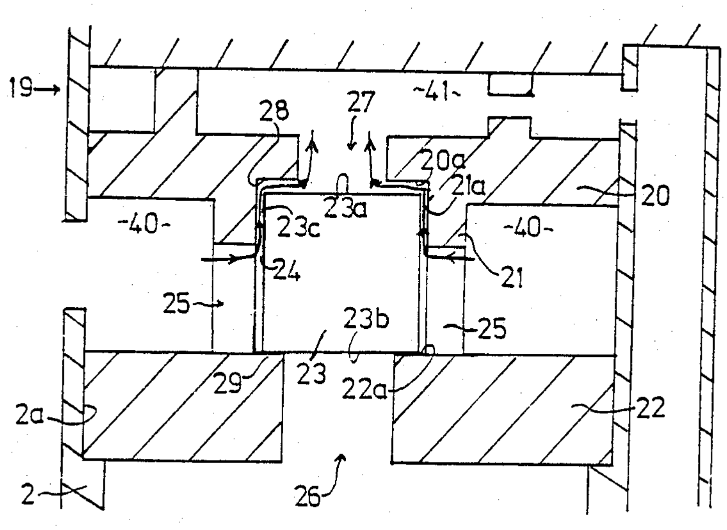
FIG. 3 is an enlarged sectional view in elevation of the control valve of the paving breaker of FIG. 1 in a second operating position.

Referring now in particular to FIGS. 2 and 3, the control valve assembly 19 comprises an upper valve block 20 located in a recessed portion **2*a* in the upper end of the cylinder 2. The valve block 20 has an annular boss 21 extending downwardly to engage a lower valve seat member 22 in the form of a disc located at the base of the recessed portion 2*a* of the cylinder 2**.

The inner surface **21*a* of the boss 21 defines cylindrical surface of a bore 24, an upper end face of the bore 24 being defined by a lower face 20*a* of the valve block 20, and a lower end face of the bore 24 being defined by an upper face 22*a* of the valve seat member 22**.

A number of radial inlets 25 are formed in the boss 21 which connect an annular chamber 40, to which compressed air is fed from the valve 11, with the bore 24. A first outlet 26 is formed by an opening, co-axial with the bore 24, in the centre of the valve seat member 22. The first outlet 26 extends axially of the bore 24 and connects the bore 24 with the interior of the upper end of the cylinder 2. A second outlet 27, also extending axially of the bore 24, and therefor co-axial with the first outlet 26, is formed in the upper portion of the valve block 20 and connects the bore 24 to a chamber 41 formed between the top of the valve block 20 and the handle arrangement 10.

A valve member 23 in the form of a cylindrical slug is located in the bore 24 of the boss 21 so as to be reciprocable therein between a first position, as shown in FIG. 2 and a second position as shown in FIG. 3. The valve member 23 is in the form of a true cylindrical slug having a uniform diameter thoughout its length. The valve member 23 may be formed from a length of steel rod. The valve member 23 has an upper end face 23*a* and a lower end face 23*b* which are ground.

In the first position as shown in FIG. 2, the upper end face 23*a* is in sealing engagement with the ground face of a shoulder 28 formed by the surface 20*a* of the valve block 20 between the bore 24 and the second outlet 27. In this position the second outlet 27 is closed and the inlets 25 communicate directly with the first outlet 26 and compressed air can flow from chamber 40 to the interior of the upper end of the cylinder 2 as indicated by the arrowed lines in FIG. 2.

In the second position shown in FIG. 3 the lower end face 23*b* of the valve member 23 engages a shoulder 29 formed by the ground upper surface 22*a* of the valve seat member 22 and the end face 23*b* is in sealing engagement with this shoulder 29. In this position the first outlet 26 is closed and the inlets 25 communicate with the outlet 27 via the clearance between the cylindrical surface 23*c* of the valve member 23 and the inner surface 21*a* of the boss 21 and compressed air can flow from chamber 40 to the chamber 41 as indicated by the arrowed lines in FIG. 3.

As seen in FIG. 1 the chamber 41 communicates with a duct 30 formed in the wall of the cylinder 2 and which is in turn connected by a lower inlet 31 to the bore 32 of the cylinder 2 below the piston 3. Also, a single outlet 33 is formed intermediate the ends of the cylinder 2 which outlet 33 communicates with atmosphere via a muffler 34.

In operation, compressed air is fed to the paving breaker 1 through the inlet connecter 18 when the throttle valve 14 is opened by depressing the operating lever 12 against the force of the spring 15 thereby allowing air to pass to the chamber 40 of the control valve assembly 19 which would initially be in the position shown in FIG. 3, i.e. its second position thereby sealing the first outlet 26 but allowing restricted flow of air to the second outlet 27 via the clearance between the ground cylindrical surface 23*c* of the valve member 23 and the inner surface 21*a* of the bore 24 in the boss 21. The compressed air passing to the outlet 27 passes through the chamber 41 and the duct 30 to the lower inlet 31 and enters the bore of the cylinder 2 below the piston 3. The pressurised air now acts on the lower face of the piston 3 and forces the piston 3 to travel upwards in the cylinder 2, since the volume of the cylinder above the piston 3 is open to the atmosphere via the outlet 33. As the piston 3 continues to move upwardly it will cover the outlet 33 and thereafter will compress the air remaining in the cylinder 2 above the piston 3. This compressed air will be forced into the outlet 26 to act on the lower end face 23*b* of valve member 23.

When the piston 3 reaches the end of its upward stroke, it will uncover the outlet 33, thus allowing the air admitted to the lower part of the cylinder 2 to exhaust to atmosphere through the outlet 33 and causing a drop in the pressure acting on the upper end face 23*a* of the valve member 23. This drop of pressure together with the action of the compressed air on the lower face 23*b* of the valve member 23 causes the valve member 23 to move from its second position, as shown in FIG. 3, to its first position, as shown in FIG. 2. In this position the outlet 27 is sealed and compressed air is allowed to pass unrestricted from the inlet 25 to the outlet 26 and thus acts against the upper face of the piston 3. The piston 3 is thus forced downwardly to strike the tappet 4 which in turn strikes the tool 7. At the same time the piston first covers the outlet 33, thus compressing the air in the lower part of the cylinder 2, then uncovers the outlet 33 to allow the air in the upper part of the cylinder to exhaust to atmosphere. This results in a drop of pressure at oulet 26 allowing the valve member 23 to move from its first position (FIG. 2) back to its second position (FIG. 3) and the cycle can then be repeated.

The clearance between the ground cylindrical surface 23*c* of the valve member 23 and the inner surface 21*a* of the bore 24 of the boss 21 is of such a magnitude that it has a significant throttling effect on the airflow from the inlet 25 to the outlet 27, when the valve member 23 is in its second position. Since the upward movement of the piston 3 is a non-working stroke, this throttling effect ensures that the correct airflow characteristics are achieved to force the piston 3 up the cylinder 2 with the minimum use of compressed air. For the most efficient operation of the valve this clearance is between twenty and sixty thousandths of one inch. On the other hand, for the working stroke of the piston 3, compressed air flows directly from inlets 25 to outlet 26.

The length of the valve member 23, relative to its diameter, also has a significant effect on the flow rate. In combination with the twenty to sixty thousandths of one inch clearance a diameter to length ratio, of the valve member, of 0.7 to 1.5 produces the best airflow characteristics.

The true cylindrical shape of the valve member 23 means that it can be easily formed from a length of steel rod without the need of expensive machinery or intricate casting techniques. The shape also allows the valve member to move smoothly and without restriction between its two positions. This ensures that the valve can change between its two positions rapidly so increasing the efficiency of the tool.

Modifications and improvements may be made without departing from the scope of the invention.

What is claimed is:

1. A control valve assembly for a pneumatic reciprocating motor comprising:

(A) a valve block;

(B) an annular boss depending from said valve block, an inner cylindrical surface of said boss defining a cylindrical bore, said bore having a lower end face and an upper end face;

(C) a first outlet in said valve block communicating with said lower end face of said cylindrical bore;

(D) a second outlet in said valve block communicating with said upper end face of said cylindrical bore;

(E) an inlet in said annular boss communicating with said cylindrical surface of the boss for providing a supply of pneumatic fluid to said bore;

(F) a cylindrical valve member reciprocal within said cylindrical bore, the valve member having an upper end face, a lower end face and a cylindrical surface of uniform diameter throughout the length of the valve member; and (G) a clearance between the cylindrical surface of the valve member and the inner cylindrical surface of said bore;

(H) said valve member being movable between a first position in which said upper face of the valve member closes said second outlet and permits flow of pneumatic fluid from the inlet directly to said first outlet and a second position in which the said lower face of the slug closes said first outlet and allows flow of pneumatic fluid from said inlet to said second outlet only through said clearance between the cylindrical surface of the valve member and the inner cylindrical surface of said bore.

2. A control valve assembly as claimed in claim 1, in which said first outlet is formed by an opening in a valve seat member which engages the lower surfaces of said boss.

3. A control valve assembly as claimed in claim 1, in which the diameter of the inner surface of said bore is between twenty and sixty thousandths of one inch greater than the diameter of the cylindrical surface of said valve member.

4. A control valve assembly as claimed in claim 1, in which said inlet comprises one or more radially extending apertures formed in said boss.

* * * * *